(12) United States Patent
Arnott (10) Patent No.: US 8,689,814 B2
(45) Date of Patent: Apr. 8, 2014

(54) REGULATED AUTOMATIC CHANGEOVER VALVE

(75) Inventor: Glen Arnott, New Braunfels, TX (US)

(73) Assignee: Michael D. Holt Company, LLC, San Antonio, TX (US)

( * ) Notice: Subject to any disclaimer, the term of this patent is extended or adjusted under 35 U.S.C. 154(b) by 565 days.

(21) Appl. No.: 13/071,220

(22) Filed: Mar. 24, 2011

(65) Prior Publication Data

US 2011/0232780 A1   Sep. 29, 2011

Related U.S. Application Data

(60) Provisional application No. 61/317,065, filed on Mar. 24, 2010.

(51) Int. Cl.
*G05D 11/02* (2006.01)

(52) U.S. Cl.
USPC .......................... 137/113; 137/112

(58) Field of Classification Search
USPC ................. 137/111, 112, 113, 114
See application file for complete search history.

(56) References Cited

U.S. PATENT DOCUMENTS

| | | | |
|---|---|---|---|
| 2,583,539 A * | 1/1952 | Bashark et al. ........ | 137/625.37 |
| 2,630,821 A * | 3/1953 | Arey et al. ............ | 137/113 |
| 2,634,743 A * | 4/1953 | Audemar ............... | 137/112 |
| 2,641,273 A * | 6/1953 | Siebens ................ | 137/113 |
| 2,651,491 A * | 9/1953 | Ashton et al. ......... | 137/112 |
| 2,654,564 A * | 10/1953 | Pech .................. | 137/112 |
| 2,675,016 A * | 4/1954 | Siver ................. | 137/112 |
| 3,472,264 A | 10/1969 | Petry | |
| 3,606,907 A * | 9/1971 | Stenberg .............. | 137/113 |
| 4,094,314 A | 6/1978 | Le Cornec | |
| 4,620,562 A | 11/1986 | Pacht | |
| 4,664,451 A | 5/1987 | Sakaguchi et al. | |
| 4,813,450 A | 3/1989 | Ishiwata et al. | |
| 4,887,573 A | 12/1989 | Fujiwara et al. | |
| 4,887,638 A | 12/1989 | Heilquist et al. | |
| 5,066,072 A | 11/1991 | Yanagi et al. | |
| 5,209,255 A | 5/1993 | Dehio | |
| 5,238,021 A | 8/1993 | Powell et al. | |
| 5,284,299 A | 2/1994 | Medlock | |
| 5,507,308 A | 4/1996 | Chambonnet | |
| 5,595,209 A | 1/1997 | Atkinson et al. | |
| 6,263,900 B1 * | 7/2001 | Cabrera et al. ........ | 137/113 |
| 6,412,516 B1 | 7/2002 | Goldsmith | |
| 6,523,565 B2 | 2/2003 | Girouard | |
| 6,554,022 B2 | 4/2003 | Wakeman | |
| 6,637,451 B2 | 10/2003 | Neff et al. | |
| 6,874,521 B1 | 4/2005 | Amidzich | |
| 6,938,841 B2 | 9/2005 | Holtzman | |
| 6,986,338 B2 | 1/2006 | Gotthelf | |
| 7,073,392 B2 | 7/2006 | Lull et al. | |
| 7,134,447 B2 | 11/2006 | Boyer | |
| 7,140,387 B2 | 11/2006 | Wilson, Jr. et al. | |
| 2008/0283130 A1 * | 11/2008 | Arnott ................ | 137/494 |

* cited by examiner

*Primary Examiner* — John Fox
*Assistant Examiner* — Kevin Murphy
(74) *Attorney, Agent, or Firm* — Jackson Walker, LLP (57) ABSTRACT

A regulated automatic changeover valve is provided. A device engages the first and second high pressure gas source for providing a lower pressure gas source downstream of the changeover valve. An eccentric is provided between two valve assemblies, with each valve assembly having a piston with a valve arm projecting therefrom. The eccentric moves a block selectively closer to one of the two valve assemblies. Each valve assembly is engaged to a high pressure source, such as a tank of compressed gas. When a first tank begins to run low, the valve will automatically begin drawing from the second valve assembly. A tank that has run low of compressed gas may be changed out while the second, non-exhausted gas continues to feed the downstream device at a regulated gas pressure.

7 Claims, 11 Drawing Sheets

REGULATED AUTOMATIC CHANGEOVER VALVE

This utility patent application claims the benefit of U.S. Provisional Patent Application Ser. No. 61/317,065, filed Mar. 24, 2010.

FIELD OF THE INVENTION

Gas pressure regulators, namely, a piston-type gas pressure regulator with a pair of valve in piston assemblies for maintaining a set outlet pressure when the high pressure source drops, from one of a pair of high pressure gas sources.

BACKGROUND OF THE INVENTION

Gas pressure regulators have a number of uses. One such use of a gas pressure regulator includes providing a fixed output pressure from a variable high pressure inlet source. For example, a high pressure tank of breathing gas at 3000 psi may provide an output gas at 20 psi to a downstream device. However, one of the shortcomings of the prior art gas pressure regulators is that, as the high pressure source is depleted, the low pressure, even when set at a fixed value, may rise above that value before the regulated valve shuts off the source. For example, as a high, variable pressure source gas initially at 3000 psi drops, through use, say to 800 psi, the initial set pressure for closure at the transition or regulated valve can rise from its initial set pressure of, for example, 20 psi, to a higher pressure of, for example, 38 psi.

While in some applications this may not be a problem, other applications are sensitive to over pressurization from an initial set pressure. Therefore, there is a need for a gas pressure regulator in which the set pressure at the outlet port or in a regulated gas chamber does not change materially with the drop in pressure of the high pressure gas.

Changeover valves are known in the prior art where a pair of high pressure gas sources feed a single device, which provides a regulated downstream pressure. Typically, one of the pair of high pressure gas sources provides pressure to the device and, when it is at or near depletion, a second high pressure gas source begins to provide regulated gas downstream of the device. That is to say, there are devices that provide a pair of high pressure gas sources to a single device to regulate the downstream flow thereof, and which devices may selectively choose one or the other of the high pressure gas sources to which it is engaged. This provides the utility of an easy switchover from one gas source to the other when one of them runs low.

OBJECTS OF THE INVENTION

It is one of several objects of the present invention to provide for a pressure regulator which is capable of maintaining a set downstream regulated pressure when engaged to a high pressure source whose high pressure may diminish in value through use.

SUMMARY OF THE INVENTION

One embodiment of Applicant's device includes a gas pressure regulator which includes a body. The body has inner walls defining an inlet port. Slidably moving within the inlet port is a y. The valve and piston assembly includes a hollow stem in slidable, gas sealing contact with the inlet port. The valve and piston assembly includes a piston having a piston head with a valved opening therethrough. Engaged with the opening in the piston head is a plug having an arm, the arm extending through the valved opening. A body of the plug lies within the sliding piston held in place by a keeper spring, the keeper spring for maintaining a removed end of the plug arm against the inner walls of the body.

With such a structure, movement of the valve and piston assembly will be capable of unseating the plug from the opening in the piston head allowing gas to flow from the hollow stem at the inlet port through an inner volume of the piston, through the valved opening of the piston head and into a regulated gas chamber defined in part by the inner walls of the body and an outer surface or crown of the piston head.

A device for engaging at least a first and a second high pressure gas source and for supplying low pressure gas to a low pressure outlet comprising a first high pressure compressed gas source, a second high pressure compressed gas source, a body having inner walls defining an inner volume and a regulated outlet, a first valve and piston assembly, including a base having outer walls, a piston having a piston head and a valved opening in the piston head, the piston head for engaging the inner walls of the body in fluid sealing relation, the first valved opening for engaging the first high pressure source, a second valve and piston assembly, including a base having outer walls, a piston having a piston head, and a valved opening in the piston head, the piston head for engaging the inner walls of the body in fluid sealing relation, the second valve and piston assembly for engaging the second high pressure gas source; a first spring means; a second spring means, wherein the two piston heads are spaced apart and, with the inner walls therebetween, define a regulated chamber, wherein the regulated outlet is in fluid communication with the regulated chamber; a selectively settable moveable member located in the regulated chamber for engagement with the first valve and piston assembly and the second valve and piston assembly, the selectively settable moveable member for selectively setting at a first position closer to the base of the first valve and piston assembly or a second position closer to the base of the second valve and piston assembly, wherein in the first position gas is valved from the first high pressure source substantially through the valved opening of the first valve an piston assembly to the regulated chamber until pressure in the chamber reaches a crossover pressure at which point the gas from the second high pressure source will feed the regulated chamber through the valved opening of the second valve and piston assembly.

BRIEF DESCRIPTION OF THE PREFERRED EMBODIMENT

Figure 1:
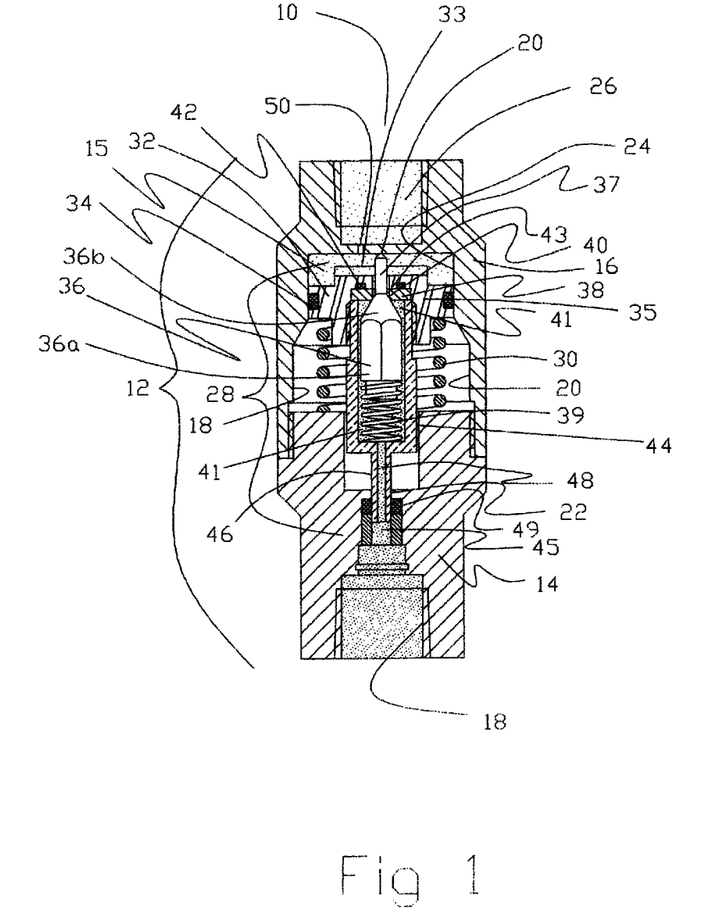
FIG. 1 is a cutaway view of one embodiment of Applicant's novel gas pressure regulator.
Figure 1A:
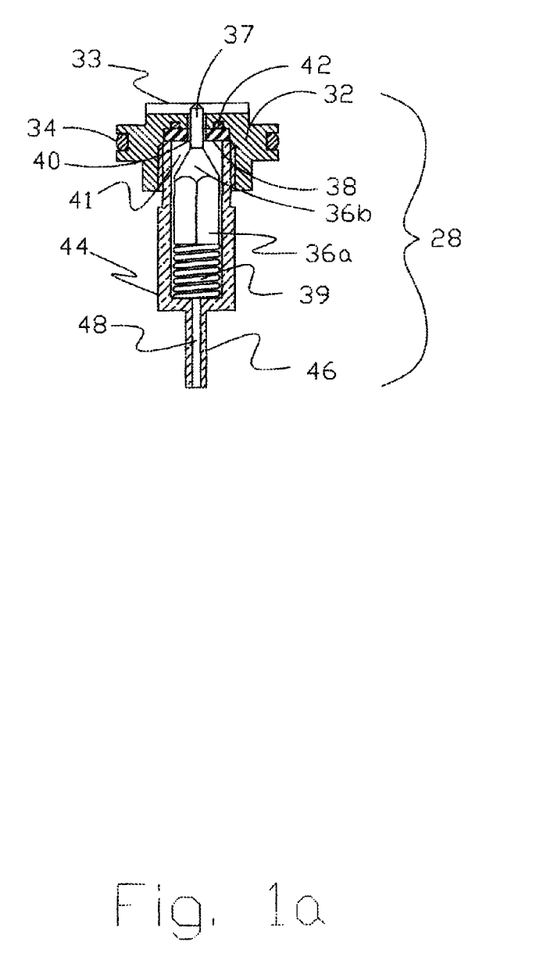
FIG. 1a is a view of the valve and piston assembly of an embodiment of the pressure regulator.
Figure 1B:
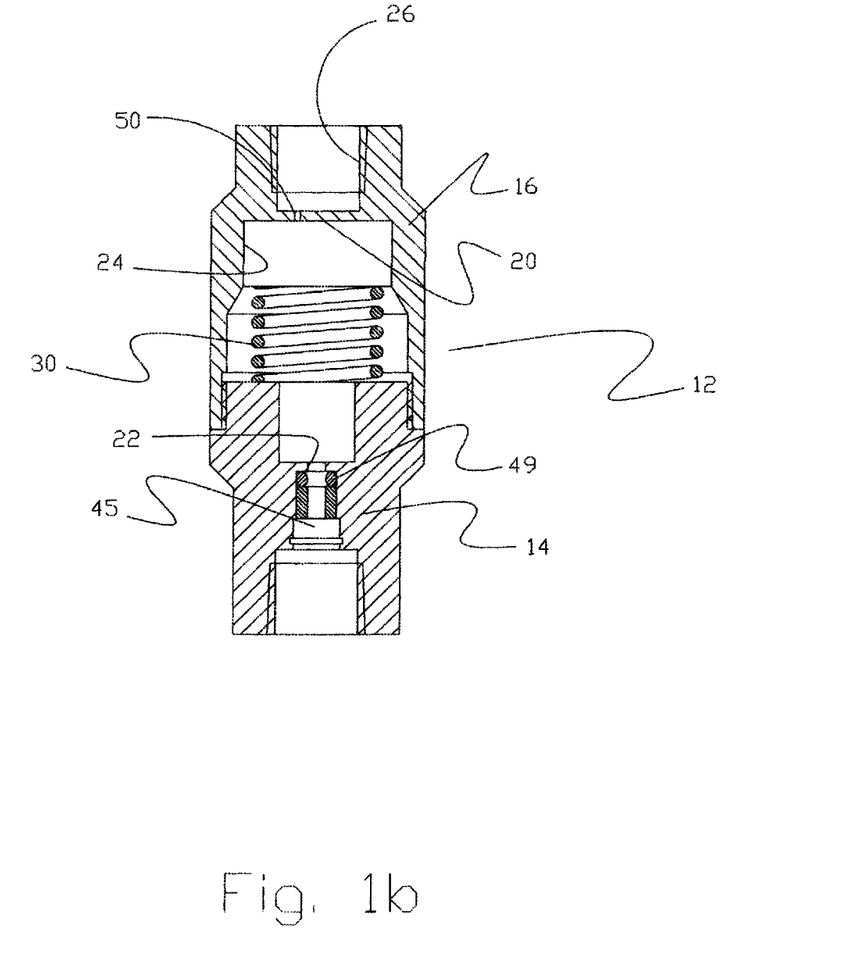
FIG. 1b is a view of the pressure regulator with the valve and piston assembly removed therefrom.

FIG. 1 is a cross-sectional area of gas pressure regulator 10 comprising body 12. Body 12 may include, in one embodiment of the invention, first portion 14 and second portion 16, the portions engaged, for example, by threads.

Body 12 may have inner walls 18, including stem guide walls 22 defining, in part, piston stem port 45. Inner walls 18 may also include piston chamber walls 24, and low pressure source walls 26.

A valve and piston assembly 28 is provided, which valve and piston assembly is acted upon by a main spring 30, which main spring engaaes inner walls 18 of body 12. A piston 35 includes a piston body 44 having a piston stem 46 and a piston head 32 having a crown 33. The piston body has a piston stem 46 for engagement with stem guide walls 22. Piston body 44 may be threadably engaged to piston head 32. O-ring 34 of piston head 32 is provided for a gas sealing engagement of piston head 32 with piston chamber walls 24. Piston head 32 includes a valved piston head opening 40. Valved piston head opening 40 may also include, in part, a seal 38, typically cylindrical such as a Delrin seal that surrounds opening 40. Seal 38 may be elastomeric and act as a seat for receiving plug 36 as set forth in more detail below. Piston stem 46 is hollow, having a channel 48, which channel is in fluid communication with walls defining an interior volume 41 of piston 35.

Valve and piston assembly 28 also includes the plug 36, the plug having a plug arm 37, the plug arm 37 extending through valved piston head opening 40. The plug 36 may have a plug body 36a including a conical section 36b, which conical section 36b may terminate at a plug arm 37. Plug keeper spring 39 acts against inner walls of piston body 44 and plug 36 so as to bias plug arm 37 towards seal 38 of valved and piston head opening 40 and against inner walls of body 12 at engagement walls 20 as seen in FIG. 1. That is, plug keeper spring 39 will assert a force against plug 36 so as to urge plug arm 37 against inner walls of body 12, while piston 35 may move longitudinally along piston chamber walls to move valved piston head opening 40 longitudinally back and forth in the piston chamber responsive to pressure at piston stem port 45 and in regulated chamber 15 to seat and unseat plug 36.

A number of O-rings are provided, including O-ring 42, between seal 38 and walls of piston head 32, O-ring 49 sealing walls of piston stem 46 against walls of body 12, namely stem guide walls 22 and O-ring 34 between the sliding piston head and body walls.

In operation, high pressure is provided at piston stem port 45, which acts through channel 48, and inner volume 41 on valved opening 40 in piston head 32. If the force asserted on the piston stem port and by spring 30 as seen in FIG. 1 (pushing the piston upward) is greater than the force pushing the piston downward, the piston will move up and, if the plug is seated against seal 38, will unseat and uncover piston head opening 40 to allow gas to enter a regulated chamber 15 defined by the piston head crown 33 and some of the inner walls of piston body 12 seen in FIG. 1. As the regulated chamber fills, pressure will be asserted on the piston crown to urge the piston in a downward direction as seen in FIG. 1 until it seats seal 38 against plug 36 closing valved opening 40. Here the forces will be substantially in balance.

To move the piston up as seen in FIG. 1, the force at piston stem 46 must overcome the force applied by gas in the regulated chamber acting against the piston crown, as well as the slight force of plug spring 39.

Looking at the forces on the seal plug, Applicant's note the balanced forces a. $A_s$=sealed area
b. $B_s$=supply fluid pressure
c. $F_s$=seal force on plug ($F_s = A_s \times B_s$)
d. $F_s = F_p$
e. $A_c$=area compression tube
f. $F_c$=force on compression tube
g. $F_c = B_s \times A_c$
h. $F_c$ varies with input pressure, $\Delta P_s$
i. $F_x + F_c = F_{rg} + F_p$, where $F_{rg}$ is force of regulated pressure, and $F_p$ is force of stem. $F_s$ is a constant (load spring).

Therefore, $F_s \approx F_p$, which $\approx F_c$; therefore, when there is a drop at $F_s$ ($\Delta F_s$), $F_p$ drops as does $F_c$. The valve is sensitive and responsive, due in part, to the cross-sectional area of the piston stem being about equal to valved opening 40.

Figure 2A:
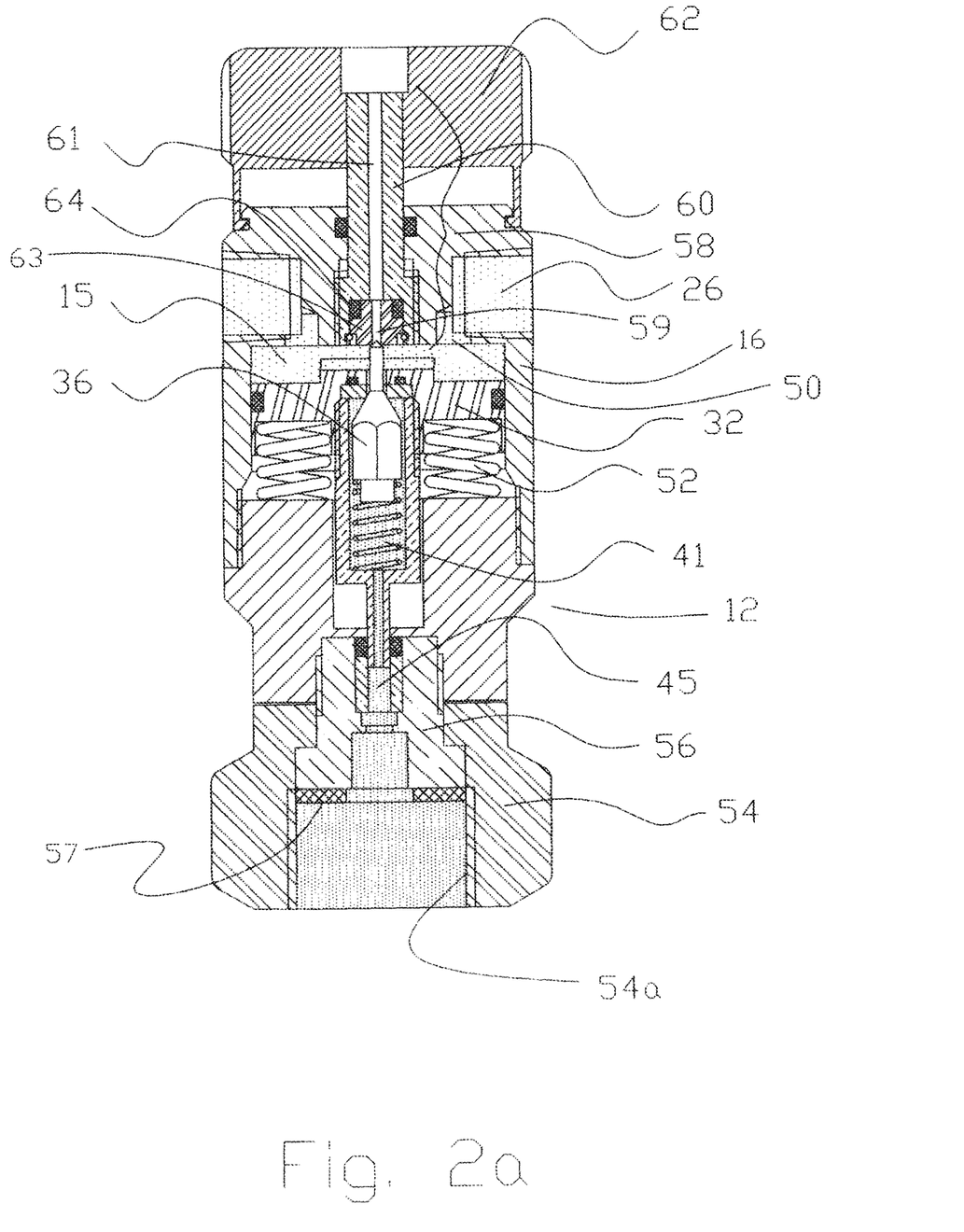
FIG. 2a is a cutaway view of another embodiment of Applicant's novel gas pressure regulator.
Figure 2B:
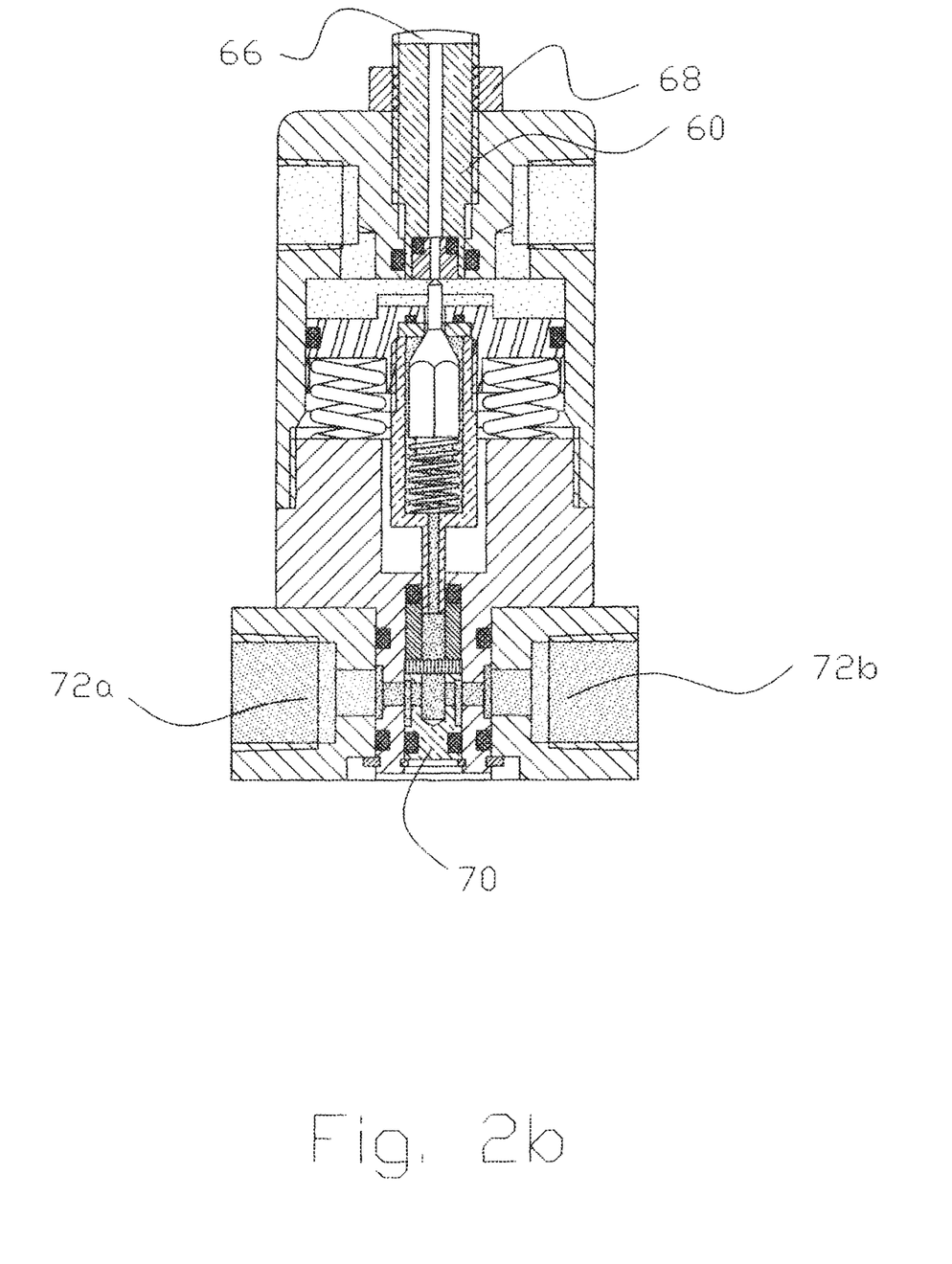
FIG. 2b is a cutaway view of another embodiment of Applicant's novel gas pressure regulator.

FIGS. 2a and 2b illustrate two variations of Applicant's novel valve and piston gas pressure regulator.

FIG. 2a illustrates that, in place of a single main spring, as shown in FIG. 1, a spring set 52 may be used. Two springs of the spring set 52 are illustrated in the view shown in FIG. 2a, but a multiplicity, here six, would be provided in the full instrument. Sets may include two or more springs. Each spring of spring set 52 is ideally materially identical and the springs of the spring set are typically arranged circumferentially around a longitudinal axis of the piston between outside walls of the piston and inner walls of the body. The use of a multiplicity of springs instead of a single spring is believed to achieve the benefits of better balance, sensitivity and accuracy, especially at low pressure; as well as the ability to provide a more compact design.

FIG. 2a also illustrates the use of a high pressure source coupling knob or coupler 54, which includes a threaded portion 54a, and which coupler 54 is engaged with valve body 12, so it may freely rotate with respect to the valve body. Further, a nipple portion 56 of valve body 12 (engaged, for example, by threads) may be dimensioned to slideably receive the valve stem and define piston stem port 45. The use of coupler 54 allows one to hold the valve body 12 in a fixed position as the coupler 54 rotatably engaged or disengaged with the threaded portion of a high pressure source, the threads for being engaged and bringing the high pressure source into gas sealing relation with seat 57. In other words, coupler 54 avoids the necessity of rotating the entire body 12 of the gas pressure regulator onto the high pressure source, such as is require in the embodiment set forth in FIG. 1.

FIG. 1 illustrates a set pressure regulator. The value of the cutoff pressure may be set by taking into account the length of the plug arm and the main spring length, as well as the main spring compression factor. For given plug arm length and main spring, movement of engagement walls towards the piston crown will increase the cutoff pressure, requiring greater spring compression before the seat meets the plug to cut off flow through the valved opening.

FIG. 2a also illustrates the use of an outlet pressure adjustment mechanism 58, which may include an over pressurization relief port 59 located in seat 63. Outlet pressure adjustment mechanism 58 includes an adjustment stem 60, adjustment stem knob 62, and adjustment stem seal 64, defining relief port 59. Stem knob 62 is in slotted engagement with adjustment stem 60. Rotating knob 62 will slide stem 60 longitudinally.

As can be seen in FIG. 2*a*, plug arm 37 engages relief port 59. Further, it is seen that adjustment stem knob 62 is rotationally engaged to the first portion of the valve body so as to rotate about the valve body. Moreover, a near end of adjustment stem 60 has a seat 63. A near end of adjusting stem 60 is threadably engaged with first portion 16 of valve body 12. Thus, when stem knob 62 (which is fixedly attached to adjusting stem 60) is rotated, it will cause adjusting stem 60 to rotate, which being threadably engaged to first portion 16 of valve body 12 will move the seat 63 with relief port 59 longitudinally. Such movement will change the distance between the piston head and relief port 59. As discussed above, for a given plug arm dimension, changing the distance from the engagement walls, here defining relief port 59, and the valved opening 40 will change the setting of the outlet pressure valve. Thus. FIG. 2*a* illustrates a manner in which the outlet pressure may be selectively set. Further, FIG. 2*a* illustrates the use of engagement walls 20 defining a relief port 59, which relief port allows for the relief of gas in an overpressurization system that may occur downstream of regulated chamber 15 by allowing gas to escape through relief port 59 and out relief port vent channel 61.

FIG. 2*b* illustrates the use of Applicant's valve and piston assembly with an adjusting stem 60 that has, instead of an adjusting knob, a screwdriver slot 66 which, when engaged to a screwdriver allows the adjustable stem 60 to be rotated as in the embodiment set forth in FIG. 2*a*, but includes a locknut 68 which, when the desired cutoff pressure is selected by positioning adjustable stem 60 with respect to the valve body, locknut 68 can be rotated down tight onto the valve body to prevent rotation of adjustable stem 60 and subsequent loss of proper set value.

FIG. 2*b* also illustrates plug seal 70 that may be used to seal high pressure source port opening as it is positioned longitudinally in the other embodiments and provide, for example, two high pressure source openings 72*a* and 72*b* laterally with respect to a longitudinal axis of the body, as seen in FIG. 2*b*.

Figure 2C:
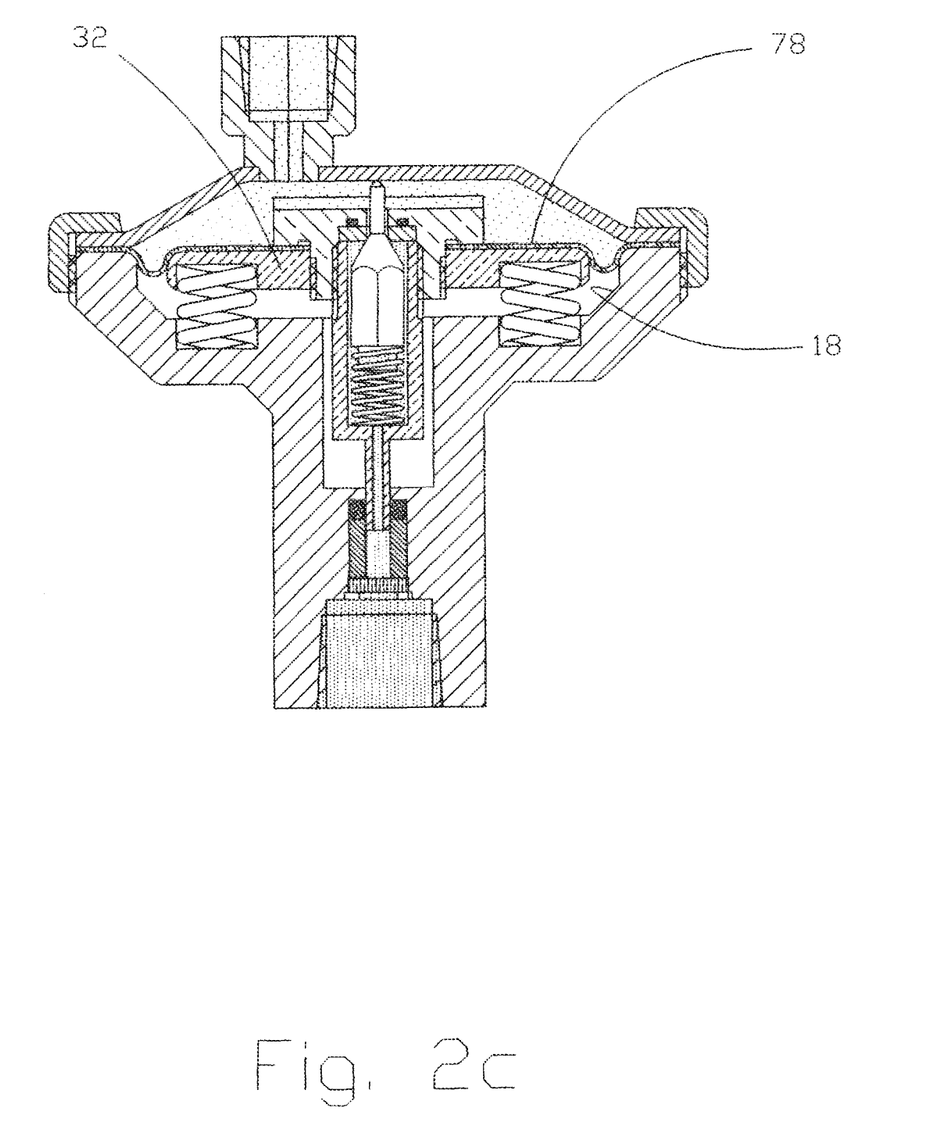
FIG. 2c is another embodiment of the pressure regulator.

FIG. 2*c* illustrates another preferred embodiment of Applicant's novel gas regulator 10. In this embodiment, a difference is the use of a flexible fluid sealing membrane 78, which seals a gap between piston head 32 and inner walls 18 of body 12. It is noted in the embodiment illustrated in FIG. 2*c*, that the frictional forces found in the earlier embodiments where the piston head and O-ring slide along the inner walls 18 are avoided—yet there is in fact an effective seal generated by fluid sealing membrane 78. Thus, it is believed that even further sensitivity may be achieved with this embodiment. Note that this embodiment may be used with one or more of the features illustrated in other embodiments. Fluid sealing membrane 78 may be made from a number of suitable materials, such as, for example, steel mesh reinforced rubber or fabric reinforced rubber or the like. Indeed a thin steel sheet may be used. Membrane 78 acts as a "bellows" in this embodiment. Thus, the embodiment illustrated in FIG. 2*c* may utilize a diaphragm action for cutoff.

The O-ring between the piston head 32 and inner walls 18 of the body 12 or the flexible membrane 78 or other means known in the art may define a fluid sealing means between the piston head and the inner walls of the body. A sealing means (hydraulic or pneumatic) will function to seal off a regulated chamber which is in fluid communication with the high pressure source through the valved opening and also a low pressure device downstream.

The use of any of the embodiments disclosed herein provide for low pressure accuracy, sensitivity and repeatability, for example, down to 5 to 7 lbs. on a ⅛ inch diameter piston, that in the prior art would typically require a larger piston diameter. The use of a flexible sealing member provides the ability to get greater area on the piston face, removes friction of the O-rings, and may provide better performance and increased accuracy at low pressure.

Figure 3:
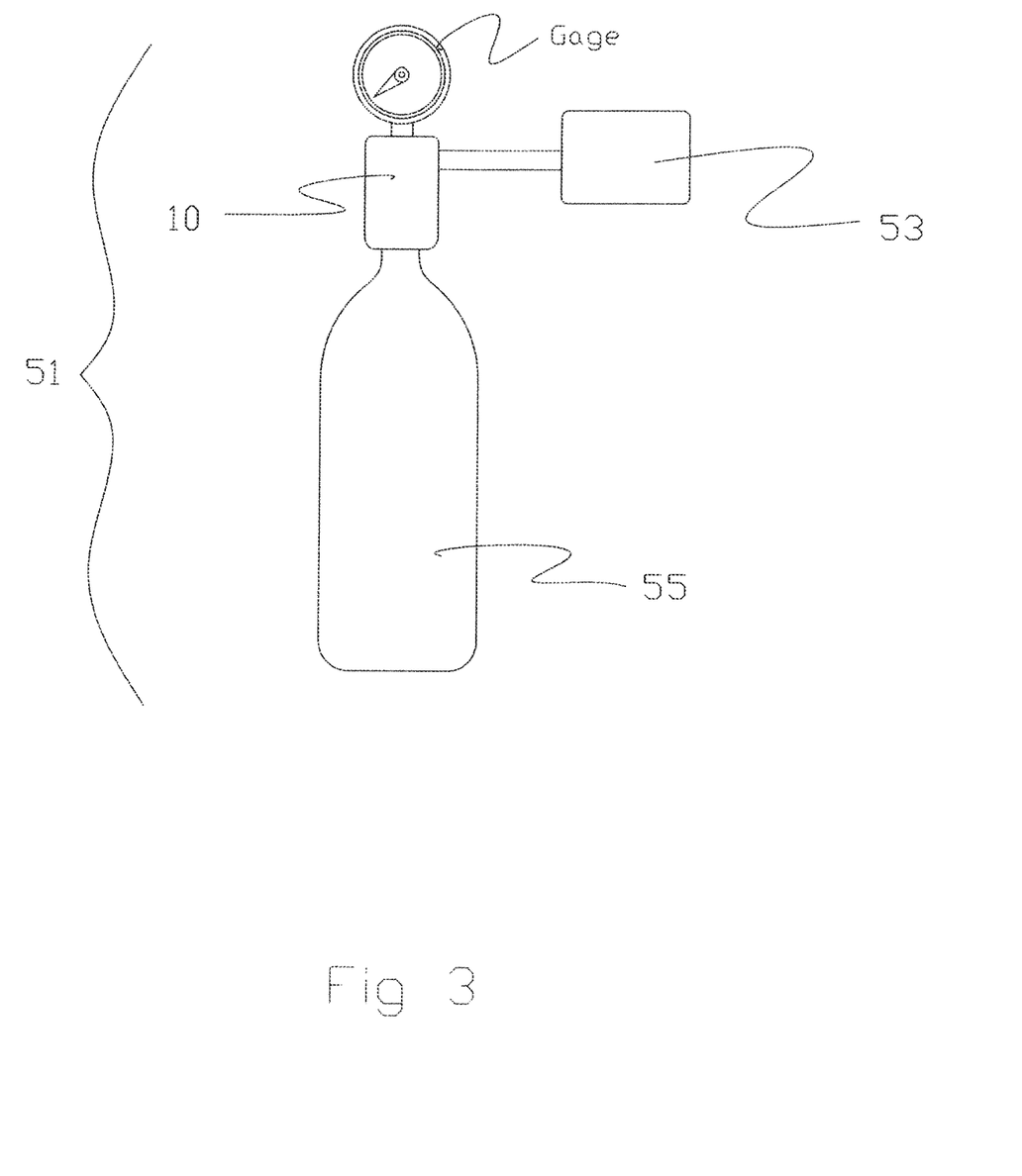
FIG. 3 is an equipment drawing of a system showing a high pressure gas source and a low pressure gas receiving device, using Applicant's novel gas pressure regulator.

FIG. 3 illustrates a system 51, which system 51 provides for a regulated transfer of gas from a high pressure source 55 to a regulated gas receiving device 53 through Applicant's novel gas pressure regulator 10 which has a valve in piston structure to compensate for a drop in pressure at high pressure source 55 as receiving device 53 uses the high pressure source gas, which structure allows the receiving device to continue to receive gas from the high pressure source at the preset pressure value. The high pressure sources may include: oxygen, a breathable gas, an inert gas, $CO_2$, $N_2$, argon, nitrous oxide or any other gas or fluid Receiving devices may include: a wine bottle, tool or any other device. The receiving device may also include a helmet for use by an astronaut, race car driver or underwater diver wherein the high pressure source is a tank containing a breathable gas.

Figure 4A:
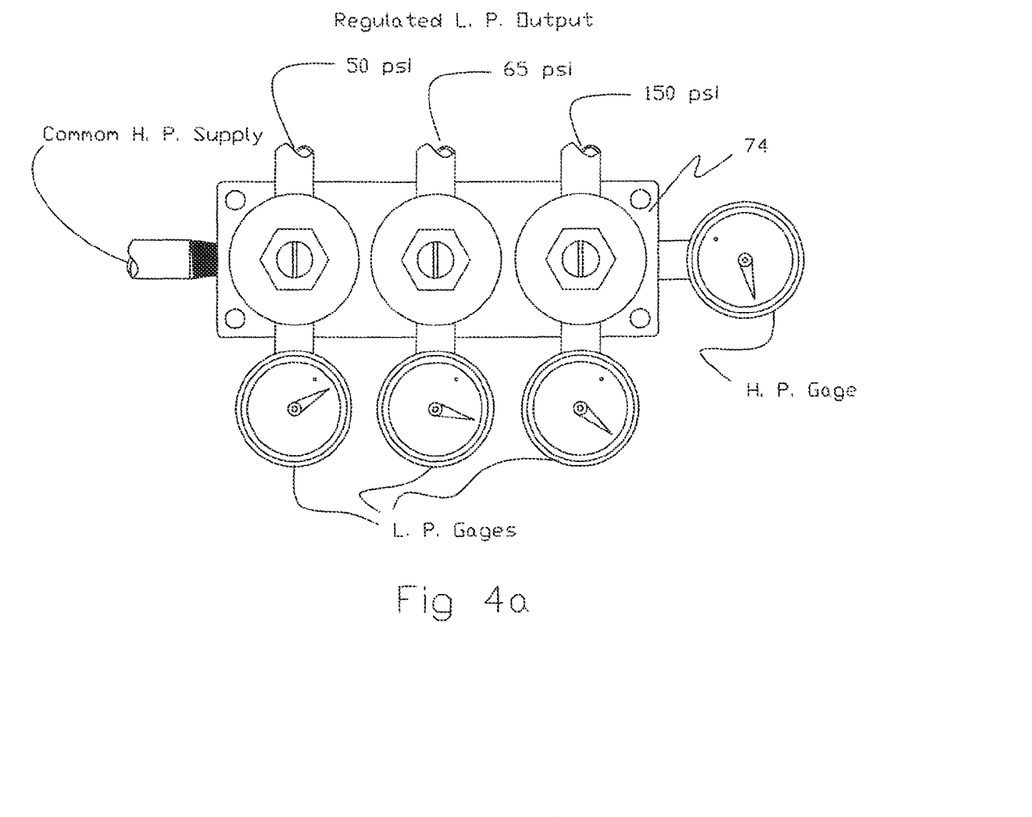
FIGS. 4a and 4b are top and side elevational views respectively of a system using a high pressure source in a multiplicity of Applicant's novel gas pressure regulators.
Figure 4B:
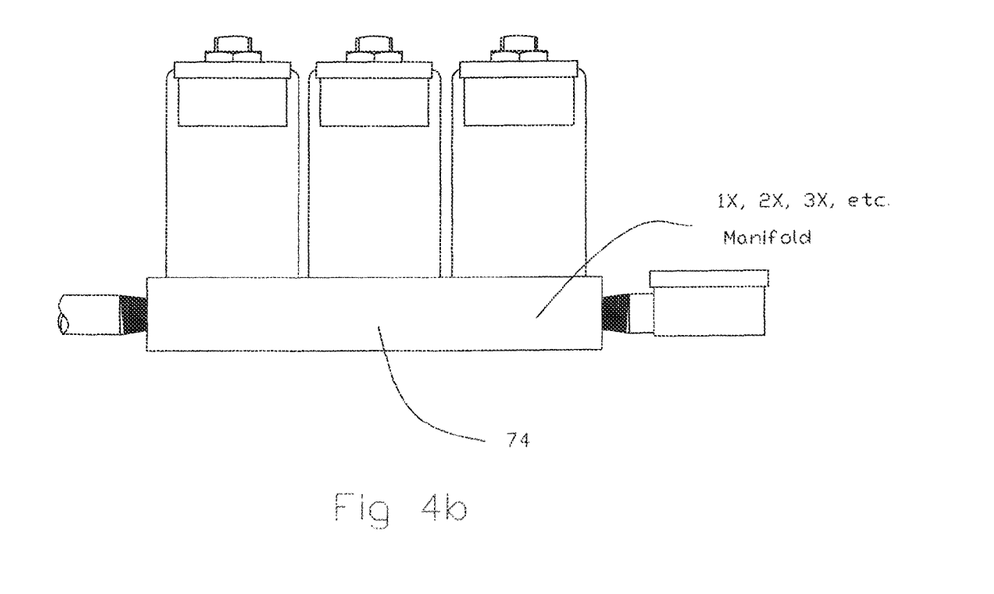

FIGS. 4*a* and 4*b* illustrate two views of the system in which a multiplicity of Applicant's novel regulator 10 (see FIG. 2*b*) are used with a manifold 74 and a high pressure supply. In this manner, one or more single high pressure supplies can provide low pressure gas to two or more low pressure receiving devices with the use of manifold 74, which manifold would have inner channels that supply fluid from the high pressure supply line, which is engaged to the walls of the manifold to the low pressure users through Applicant's novel gas regulators 10. In the system illustrated, the first gas pressure regulator is set at a first cutoff pressure, here 50 lbs., at a second pressure, here 65 lbs., and the third at a third pressure, here 150 lbs.

FIGS. 5-7B illustrate a regulated automatic changeover device 100, which utilizes a pair of valve and piston assemblies 118/120 generally as described above, to provide a regulated gas to downstream the device. By using a pair of valve and piston assemblies, as well as a pair of high pressure sources (such as bottled compressed gas), a regulated gas using device downstream of the regulated automatic changeover device 100 may be provided with regulated gas from one of the two high pressure sources. Moreover, when a selected one of the two high pressure sources is depleted and reaches the adjustable, pre-selected downstream regulated gas pressure at the regulated outlet, the second high pressure source automatically feeds the regulated outlet at the preset regulated pressure.

For example, let's assume a downstream regulated gas source (such as a downstream regulator 107, for example) requires regulated gas at about 125 psi. Two high pressure sources 114/116, such as a pair of 1500 psi tanks, may engage the changeover device 100. When both of the high pressure sources are opened and the pair of valve and piston assemblies 118/120 adjusted to the proper downstream pressure, for example, about 175 psi, the downstream regulated gas device will use up gas from a selected one (Tank B, FIG. 5, for example) of the two sources and, when that selected source starts to get low (dropping to about 155 psi, in this example), the changeover valve automatically begins to draw regulated gas from the second high pressure source.

Figure 5:
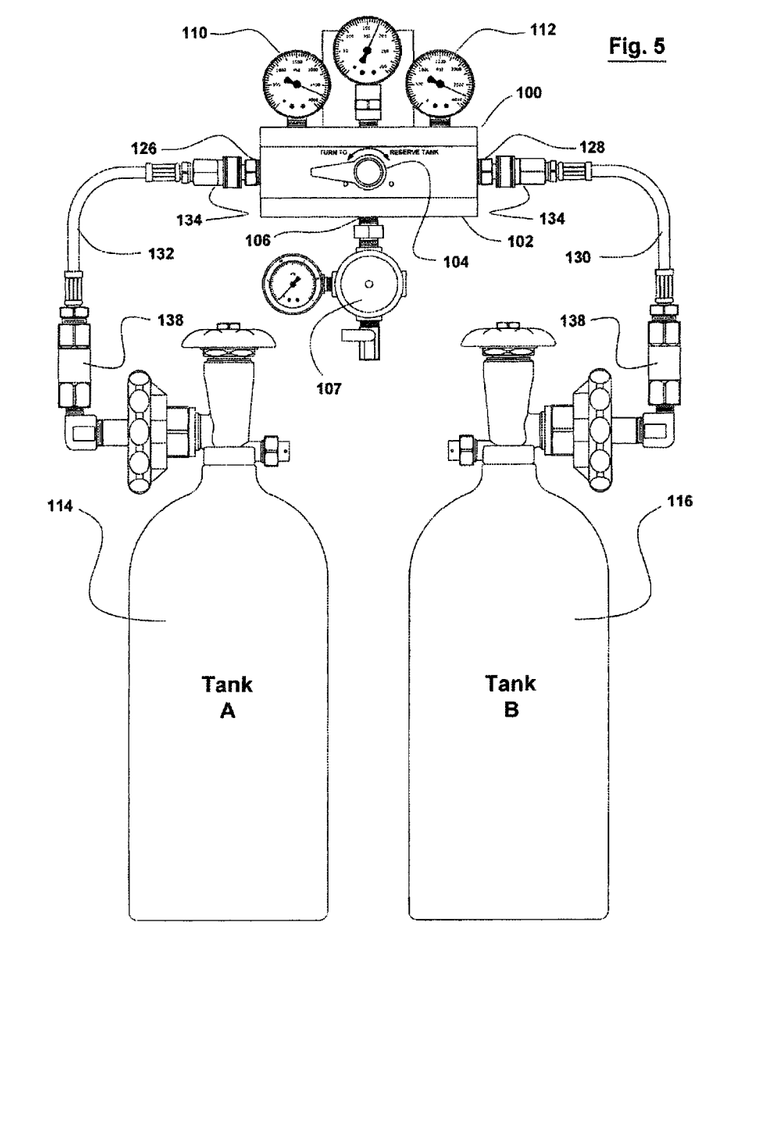
FIG. 5 is an elevational view of a regulated automatic changeover valve in which two high pressure sources, such as compressed gas from Tank A and Tank B feed the device and provide a regulated flow downstream thereof.

The changeover device 100 includes a body 102. The body has inner walls. A changeover lever 104 operates in a manner described below to manually switch from one high pressure source 114/116 to the other 114/116. A regulated outlet 106 is provided with an output pressure gauge 108. A first high pressure gas gauge 110 and a second high pressure gas gauge 112 measure pressure from a first high pressure gas source 114 (Tank A) and a second high pressure gas source 116 (Tank B), the two gas sources typically feeding the removed ends of body 102 at bases 119/121. The body is dimensioned to receive a first valve and piston assembly 118 and a second valve and piston assembly 120, the two assemblies 118/120 are described substantially as set forth in the specification above. Note the valve and piston assemblies 118/120 operate off bases 119/121, which threadably and fluid sealingly engage the inner walls of the body. The bases 119/121 may be threadably adjusted to selectively move longitudinally with respect to the body as set forth more fully below. This adjustment will effect shutoff pressure at their valved openings 40.

FIG. 5 also illustrates a pair of nipple fittings 126/128 that may be used in conjunction with flexible lines 130/132 to connect high pressure Hp gas sources 114/116 to bases 119/121. Check valves 134 may be engaged with flexible lines 130/132.

An eccentric shaft 122 is provided for engaging the body 102 and for engaging a channeled shifting block 124 and the changeover lever (handle 104) as set forth in FIGS. 5-7B.

Figure 6:
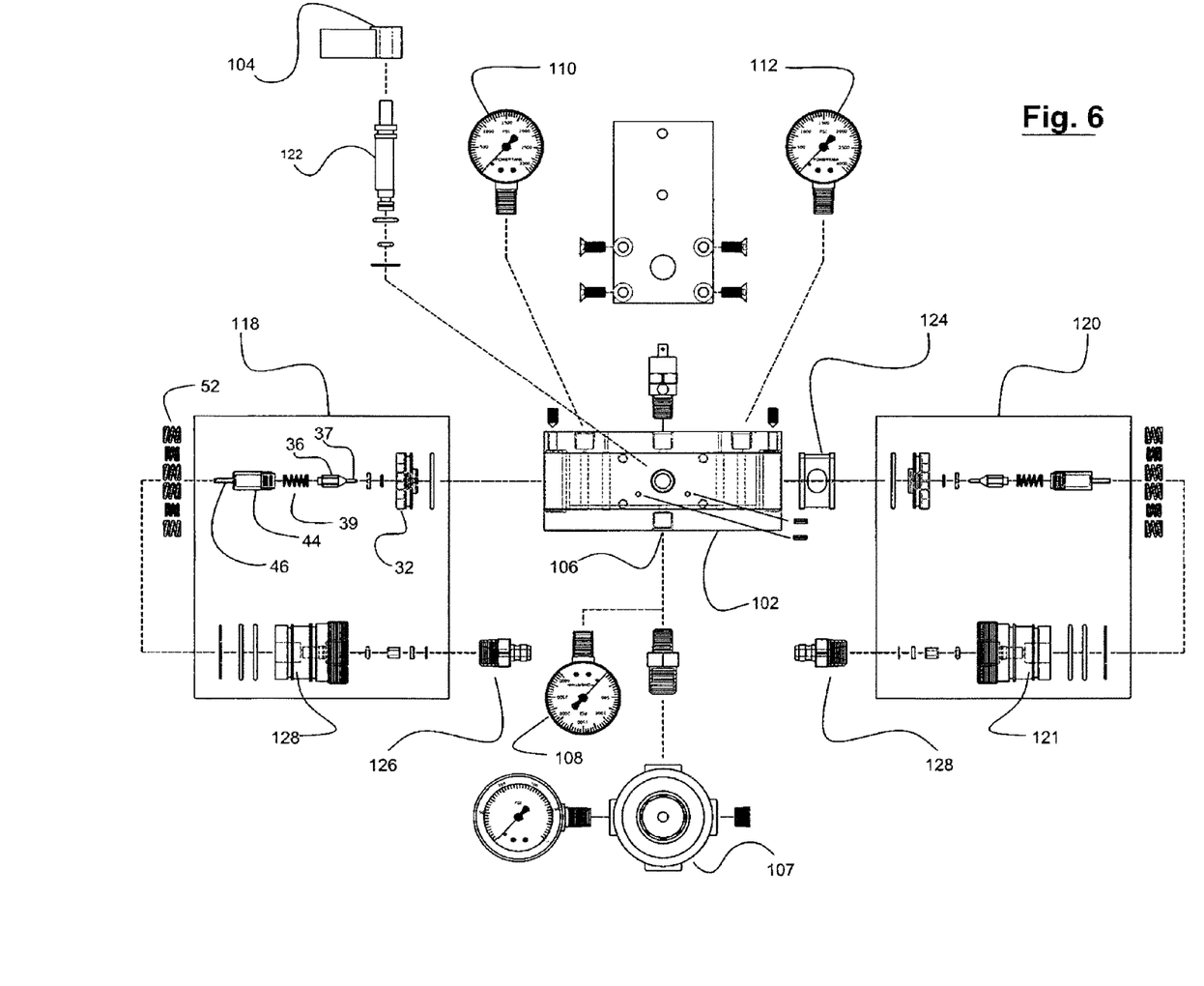
FIG. 6 is an exploded view of the regulated automatic changeover valve illustrated in FIG. 5.

The channeled shifting block 124 is a generally cylindrical disk-shaped element having a first wall 124a and spaced apart from and parallel with a second wall 124b. A shaft opening 124c is dimensioned to receive the body of the eccentric shaft 122 therein as set forth below. Connecting or perimeter channel 124d provides for gaseous communication across the shifting block 124. Perimeter 124e defines the walls which space apart the first and second walls 124a/124b. Detents 124f and 124g are provided in first and second ails 124a/124b to help seat the removed ends of the plug arms 37.

Figure 7A:
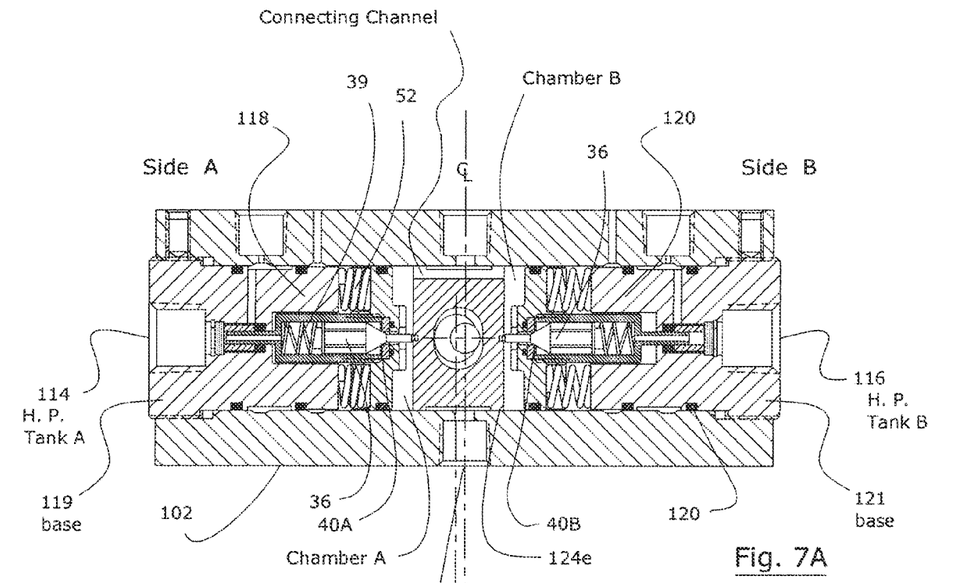
FIGS. 7A and 7B are cross-section elevational views of the changeover valve illustrating two positions of the shifting channel block.

FIGS. 7A and 78B illustrate a cross-sectional view of changeover device 100. In FIG. 7A, eccentric shaft has moved the shifting block to the left, and in FIG. 7B, the eccentric shaft has moved the shifting block to the right.

In FIG. 7A, when the eccentric block is shifted to the left, the effect is to push plug 36 to the left, which will allow gas from a pressurized high pressure gas source to flow into chamber A, across the connecting channel into chamber B, and downstream out of the regulated outlet 106. A secondary regulator 107 may engage the regulated outlet 106.

Assuming high pressure source A is full and at 1500 psi and the adjusted setting (reflecting, in part, spring 52 compression) is 175 psi, then the downstream source, here represented, for example, by secondary regulator 107 (for example, a 125 psi regulator for use in carbonating water). That is to say, the spring compression will set the regulated output pressure and will be adjusted in the manner set forth below, typically, for example, at the factory. In this example, the outlet pressure is set by adjusting bases 119/121 with respect to the body, to say 180 psi as reflected on the setting gauge. As a 1500 psi source 114 gets used up and drops to drop about 155 psi, the Chambers A/B will begin to draw from source 116 (for example, Tank B).

When both Tank A and Tank B are at 1500 psi and the channel shifting block is in the position in FIG. 7A, the low Chamber A/B is fed by Tank A until the pressure in Chambers A/B drops to about 155 psi. When it drops to about 155 psi, then Tank B (116) will begin feeding Chambers A/B drops with gas valved through valved piston head opening 40B of valve and piston assembly 120. By way of explanation, when the channeled shifting block 124 is in the position illustrated in FIG. 7A, it is holding the plug area spaced apart from the valved opening 40A in the piston head of valve and piston assembly 118, at the same time the piston head of valve and piston assembly 120 is spaced away from wall 124b of channel shifting block 124 such that valved opening 40b closes.

Crossover pressure (about 155 psi in this example) occurs when the pressure in Chambers A and B drops to about 155 (changeover pressure). At this point, the side B piston has moved to the left sufficiently so that the plug area acting on channel shifting block 124 opens valved opening 40B. However, when the changeover occurs, then Tank B is feeding Chamber A/B at 166 psi, but if the lever 104 is flipped so the block is in the position shown in FIG. 7B, Tank B will feed the chamber at about 175 psi.

Figure 7B:
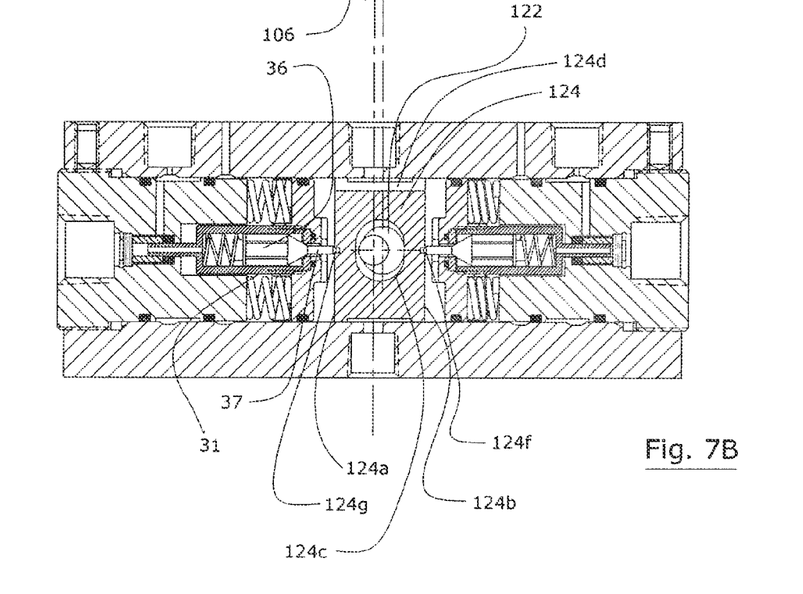

As seen in FIGS. 6, 7A, and 7B, there is an offset of the shifting block from centerline CL. The amount of offset dictates the difference (differential) in the amount of pressure required to close the valved opening in the respective valve and piston assemblies. It is seen in FIG. 7A that greater pressure is required to close the valved opening 40A of valve and piston assembly 118, because the plug is further away from the centerline than the valve and piston assembly 120, which is on the right side. Crossover is a function of the amount of offset that the eccentric shaft creates from the centerline. If you want a greater difference between the set pressure (closure of valved opening when the piston spring is compressed as seen in FIG. 7A for valve and piston assembly 118), then you would have more offset. With less offset from the centerline, the changeover pressure is closer to the set pressure, but you always need some offset. In the example illustrated an offset of the centerline to either side of about 0.009 inches has proven effective. Thus, one can adjust changeover by adjusting the amount of eccentric.

Setting the high side supply is accomplished as follows. With both tanks full and engaged, handle 104 is placed in the position indicated in FIG. 5 (corresponding to FIG. 7A). Gauge 110 should read about 1500 psi (in this example, indicating Tank A is full). A tool is engaged with base 119 and rotated in or out, while watching gauge 111, which gauge reflects gas pressure in Chambers A/B (here 175 psi). Moving base 119 out (away from CL) will drop the high pressure, moving in will increase it. Handle is then switched to side B and the procedure is repeated for the same high pressure, here 175 psi.

Low side is predetermined by the eccentric, in one example, 0.009" either side of center line (0.018" total). The higher pressure drop (from our 175 psi example) desired the higher the eccentric. Here, the 0.009" eccentric generates about 20 psi of differential (to change over), for the given spring valve, here about 20 pounds per spring.

With the handle to the left and both sides tanks full (about 1500 psi), the Tank A will feed Chambers A/B until the low or about 155 psi is reached (that is, 175 psi-20 psi). Then, Tank B will begin to feed Chambers A/B at about 155 psi. If one were to move the handle 104 to Tank B, then Tank B would feed Chambers A/B at 175 psi.

Observing gauges 110/112 will give presses in Tanks A/B. For example, if the handle is pointing to left as in FIG. 5, but the gauge 110 reads empty, then Tank A can be changed out with a full tank, so long as a check valve, here 138, is present in the line. During change out of either tank, the other will feed the downstream source, here regulator 107, unless it too is empty.

Flexible lines 130/132 may be used with fittings 126/128. Moreover, the flexible lines may have quick couplings 134 to engage fittings 126/128. Check valves 138 are provided to ensure that gas flow is into the valve.

When setting the gauges, the spring should not be fully compressed; that is, not to solid height. It is further noted that a single spring may be used instead of a spring set.

Typically, the changeover device valve is adjusted at the factory according to desired usage. For example, a secondary regulator set for an output of 125 psi may be set downstream of the secondary regulator of the changeover valve outlet. Side A is adjusted with the high pressure Tank A open and the lower pressure outlet closed. For example, a wrench is used to move the threaded bases 119/121 to the right or left as gauge 108 is observed and the set pressure can be adjusted to, for example, 175 psi.

Apparent from the Figures, especially FIGS. 7A and 7B, is that Chambers A and 13 are in fluid communication. When the shifting block is in the position illustrated in FIG. 7A, gas pressure drop in Chambers A/B will close off side first, due to the less compressive force (distance) required for the valved opening to reach shutoff at the plug. At the same time, the shifting block has kept the plug on side A spaced apart compared to centerline CL as seen in FIGS. 7A and 7B. With side A shutoff Chambers A/B is filled with gas from high pressure Tank A.

In the example used, the left side with the block as indicated in FIG. 7A may shut off at a chamber pressure of 140 psi. While in the position as seen in FIG. 7B, however, the shutoff pressure may be, for example, 140# and side B is now shut off at 180#.

Although the invention has been described in connection with the preferred embodiment, it is not intended to limit the invention's particular form set forth, hut on the contrary, it is intended to cover such alterations, modifications, and equivalences that may be included in the spirit and scope of the invention as defined by the appended claims. For example, gas is considered to be a fluid, the device may operate with either a liquid or a gas.

The invention claimed is:

1. A device for engaging at least a first and a second high pressure gas source and for supplying low pressure gas to a low pressure outlet comprising:
   a first high pressure compressed gas source;
   a second high pressure compressed gas source;
   a body having outer walls and inner walls, the inner walls defining an inner volume and a regulated outlet;
   a first valve and piston assembly, including a base having outer walls and inner walls, a piston having a piston head and a valved opening in the piston head, the piston head for engaging the inner walls of the body in fluid sealing relation, the first valved opening for engaging the first high pressure source;
   a second valve and piston assembly, including a base having outer walls and inner walls, a piston having a piston head, and a valved opening in the piston head, the piston head for engaging the inner walls of the body in fluid sealing relation, the second valve and piston assembly for engaging the second high pressure gas source;
   a first spring means;
   a second spring means;
   wherein the two piston heads are spaced apart and, with the inner walls therebetween, define a regulated chamber, wherein the regulated outlet is in fluid communication with the regulated chamber;
   a selectively settable moveable member located in the regulated chamber capable of engagement with the first valve and piston assembly and the second valve and piston assembly, the selectively settable moveable member for selectively setting at a first position closer to the base of the first valve and piston assembly or a second position closer to the base of the second valve and piston assembly;
   wherein in the first position gas is valved from the first high pressure source substantially through the valved opening of the first valve and piston assembly to the regulated chamber until pressure in the chamber reaches a crossover pressure at which point the gas from the second high pressure source will feed the regulated chamber through the valved opening of the second valve and piston assembly.

2. The valve of claim 1, further including a moveable lever, engaged with the selectively sellable moveable ember for moving the selectively settable moveable member from the first position to the second position.

3. The valve of claim 1, wherein a portion of the inner walls of the body are threaded and the bases of the two assemblies are threaded for threadable engagement with the body.

4. The valve of claim 1, wherein the selectively sellable moveable member is a shifting block and further including a lever, the lever including an eccentric shaft for engaging the shifting block.

5. The valve of claim 1, wherein the first valve and piston assembly includes a spring loaded poppet valve for valving the valved opening of the first valve and piston assembly; and the second valve and piston assembly includes a spring loaded poppet valve for valving the valved opening of the second valve and piston assembly, wherein the poppet valves are dimensioned to engage the selectively sellable moveable member.

6. The valve of claim 1, wherein the pistons of each of the valve and piston assemblies include a piston stem and wherein the base of the first and second valve and piston assemblies each includes a port for engaging a stem of the pistons of the two valve and piston assemblies.

7. The valve of claim 1, wherein the area of the port approximately equals the area of the valved opening.

* * * * *